United States Patent
Vanstone et al.

(10) Patent No.: US 9,571,274 B2
(45) Date of Patent: Feb. 14, 2017

(54) KEY AGREEMENT PROTOCOL

(71) Applicant: INFOSEC GLOBAL INC., Toronto (CA)

(72) Inventors: Scott A Vanstone, Campbellville (CA); Adrian Antipa, Brampton (CA)

(73) Assignee: Infosec Global Inc.

( * ) Notice: Subject to any disclaimer, the term of this patent is extended or adjusted under 35 U.S.C. 154(b) by 0 days.

(21) Appl. No.: 14/313,403

(22) Filed: Jun. 24, 2014

(65) Prior Publication Data
US 2015/0003615 A1 Jan. 1, 2015

Related U.S. Application Data

(60) Provisional application No. 61/839,961, filed on Jun. 27, 2013.

(51) Int. Cl.
*H04L 9/08* (2006.01)

(52) U.S. Cl.
CPC .................. *H04L 9/0847* (2013.01)

(58) Field of Classification Search
CPC ...... H04L 9/0825; H04L 9/3263; H04L 9/083; H04L 2209/80; H04L 63/0823
USPC ........................................................ 380/282
See application file for complete search history.

(56) References Cited

U.S. PATENT DOCUMENTS

| | | | | |
|---|---|---|---|---|
| 7,773,754 | B2* | 8/2010 | Buer et al. | 380/277 |
| 2004/0005061 | A1* | 1/2004 | Buer et al. | 380/282 |
| 2004/0030932 | A1* | 2/2004 | Juels et al. | 713/202 |
| 2007/0076879 | A1* | 4/2007 | Asokan et al. | 380/255 |
| 2008/0077976 | A1* | 3/2008 | Schulz | 726/5 |
| 2010/0023771 | A1* | 1/2010 | Struik | 713/171 |

FOREIGN PATENT DOCUMENTS

EP 2395698 12/2011

OTHER PUBLICATIONS

International Search Report corresponding to PCT/CA2014/050603; Canadian Intellectual Property Office; issued Aug. 27, 2014.
Written Opinion of the International Searching Authority corresponding to PCT/CA2014/050603; Canadian Intellectual Property Office; issued Aug. 27, 2014.

* cited by examiner

*Primary Examiner* — Ali Abyaneh
*Assistant Examiner* — Stephen Sanders
(74) *Attorney, Agent, or Firm* — Bhole IP Law; Anil Bhole

(57) ABSTRACT

The present invention relates to data communication systems and protocols utilized in such systems.

21 Claims, 3 Drawing Sheets

KEY AGREEMENT PROTOCOL

TECHNICAL FIELD

The present invention relates to data communication systems and protocols utilized in such systems.

BACKGROUND

Data communication systems are used to exchange information between devices. The information to be exchanged comprises data that is organized as strings of digital bits formatted so as to be recognizable by other devices and to permit the information to be processed and/or recovered.

The exchange of information may occur over a publically accessible network, such as a communication link between two devices, over a dedicated network within an organization, or may be between two devices within the same dedicated component, such as within a computer or point of sale device.

The devices may range from relatively large computer systems through to telecommunication devices, cellular phones, monitoring devices, sensors, electronic wallets and smart cards, and a wide variety of devices that are connected to transfer data between two or more of such devices.

A large number of communication protocols have been developed to allow the exchange of data between different devices. The communication protocols permit the exchange of data in a robust manner, often with error correction and error detection functionality, and for the data to be directed to the intended recipient and recovered for further use.

Because the data may be accessible to other devices, it is vulnerable to interception and observation or manipulation. The sensitive nature of the information requires that steps are taken to secure the information and ensure its integrity.

A number of techniques collectively referred to as encryption protocols and authentication protocols have been developed to provide the required attributes and ensure security and/or integrity in the exchange of information. These techniques utilize a key that is combined with the data.

There are two main types of cryptosystems that implement the protocols, symmetric key cryptosystems and asymmetric or public key cryptosystems. In a symmetric key cryptosystem, the devices exchanging information share a common key that is known only to the devices intended to share the information. Symmetric key systems have the advantage that they are relatively fast and therefore able to process large quantities of data in a relatively short time, even with limited computing power. However, the keys must be distributed in a secure manner to the different devices, which leads to increased overhead and vulnerability if the key is compromised.

Asymmetric or public key cryptosystems utilize a key pair, one of which is public and the other private, associated with each device. The public key and private key are related by a "hard" mathematical problem so that even if the public key and the underlying problem are known, the private key cannot be recovered in a feasible time. One such problem is the factoring of the product of two large primes, as utilized in RSA cryptosystems. Another is the discrete log problem in a finite group. A generator, $\alpha$, of the underlying group is identified as a system parameter and a random integer, k, generated for use as a private key. To obtain a public key, K, a k-fold group operation is performed so that $K=f(\alpha,k)$.

Different groups may be used in discrete log cryptosystems including the multiplicative group of a finite field, the group of integers in a finite cyclic group of order p, usually denoted Zp* and consisting of the integers 0 to p−1. The group operation is multiplication so that $K=f(\alpha^k)$.

Another group that is used for enhanced security is an elliptic curve group. The elliptic curve group consists of pairs of elements, one of which is designated x and the other y, in a field that satisfy the equation of the chosen elliptic curve. For an elliptic curve group of order p, the elliptic curve would generally be defined by the relationship $y^2$ mod $p=x^3+ax+b$ mod p. Other curves are used for different groups, as is well known. Each such pair of elements is a point on the curve, and a generator of the group is designated as a point P. The group operation is addition, so a private key k will have a corresponding public key f(kP).

Public key cryptosystems reduce the infrastructure necessary with symmetric key cryptosystems. A device may generate an integer k, and generate the corresponding public key kP. The public key is published so it is available to other devices. The device may then use a suitable signature protocol to sign a message using the private key k and other devices can confirm the integrity of the message using the public key kP.

Similarly, a device may encrypt a message to be sent to another device using the other devices public key. The message can then be recovered by the other device using the private key. However, these protocols are computationally intensive, and therefore relatively slow, compared with symmetric cryptosystem protocols.

Public key cryptosystems may also be used to establish a key that is shared between two devices. In its simplest form, as proposed by Diffie-Hellman, each device sends a public key to the other device. Both devices then combine the received public key with their private key to obtain a shared key.

One device, usually referred to as an entity (or correspondent), Alice, generates a private key $k_a$ and sends another device, or entity, Bob, the public key $k_a P$.

Bob generates a private key $k_b$ and sends Alice the public key $k_b P$

Alice computes $k_a \cdot k_b P$ and Bob computes $k_b \cdot k_a P$ so they share a common key $K=k_a k_b P=k_b k_a P$. The shared key may then be used in a symmetric key protocol. Neither Alice nor Bob may recover the private key of the other, and third parties cannot reconstruct the shared key.

In order to ensure integrity of the shared key, and to rebut attacks that have been developed to recover or substitute the shared key and/or the private keys within the shared key, key establishment protocols have been developed.

Key establishment is the process by which two (or more) entities establish a shared secret key. The key is subsequently used to achieve some cryptographic goal such as confidentiality or data integrity.

Broadly speaking, there are two kinds of key establishment protocols: key transport protocols in which a key is created by one entity and securely transmitted to the second entity, and key agreement protocols in which both parties contribute information which jointly establish the shared secret key. The present application is directed to key agreement protocols for the asymmetric (public-key) cryptosystems.

If Alice and Bob are two honest entities, i.e., legitimate entities who execute the steps of a protocol correctly, then informally speaking, a key agreement protocol is said to provide implicit key authentication (of Bob to Alice) if entity Alice is assured that no other entity aside from a specifically identified second entity Bob can possibly learn the value of a particular secret key. The property of implicit key authentication does not necessarily mean that Alice is assured of Bob actually possessing the key, but is assured that no one other than Bob possesses the key. A key agreement protocol which provides implicit key authentication to both participating entities is called an authenticated key agreement (AK)protocol.

Informally speaking, a key agreement protocol is said to provide key confirmation (of Bob to Alice) if entity A is assured that the second entity Bob actually has possession of a particular secret key. If both implicit key authentication and key confirmation (of Bob to Alice) are provided, then the key establishment protocol is said to provide explicit key authentication (of Bob to Alice). A key agreement protocol which provides explicit key authentication to both participating entities is called an authenticated key agreement with key confirmation (AKC) protocol. An extensive survey on key establishment is provided at Chapter 12 of Menezes, van Oorshot and Vanstone's Handbook of Applied Cryptography, the contents of which are incorporated by reference.

Extreme care must be exercised when separating key confirmation from implicit key authentication. If an AK protocol which does not offer key confirmation is used, then, as pointed out in the 1997 paper by S. Blake-Wilson, D. Johnson, and A. Menezes entitled "Key agreement protocols and their security analysis", it is desirable that the agreed key be confirmed prior to cryptographic use. This can be done in a variety of ways. For example, if the key is to be subsequently used to achieve confidentiality, then encryption with the key can begin on some (carefully chosen) known data. Other systems may provide key confirmation during a "real-time" telephone conversation. Separating key confirmation from implicit key authentication is sometimes desirable because it permits flexibility in how a particular implementation chooses to achieve key confirmation, and thus moves the burden of key confirmation from the establishment mechanism to the application.

Numerous Diffie-Hellman-based AK and AKC protocols have been proposed over the years; however, many have subsequently been found to have security flaws. The main problems were that appropriate threat models and the goals of secure AK and AKC protocols lacked a formal definition. Blake-Wilson, Johnson and Menezes, adapting earlier work of Bellare and Rogaway in the symmetric setting, provided a formal model of distributed computing and rigorous definitions of the goals of secure AK and AKC protocols within this model. Concrete AK and AKC protocols were proposed, and proven secure within this framework in the random oracle model.

It is expected that a secure protocol should be able to withstand both passive attacks (where an adversary attempts to prevent a protocol from achieving its goals by merely observing honest entities carrying out the protocol) and active attacks (where an adversary additionally subverts the communications by injecting, deleting, altering or replaying messages).

In addition to implicit key authentication and key confirmation, a number of desirable security attributes of AK and AKC protocols have been identified:

1. known-key security. Each run of a key agreement protocol between A and B should produce a unique secret key; such keys are called session keys. A protocol should still achieve its goal in the face of an adversary who has learned some other session keys.
2. (perfect) forward secrecy. If long-term keys of one or more entities are compromised, the secrecy of previous session keys established by honest entities are not affected.
3. key-compromise impersonation. Suppose A's long-term key is disclosed. Clearly an adversary that knows this value can now impersonate A, since it is precisely this value that identifies A. However, it may be desirable that this loss does not enable an adversary to impersonate other entities to A.
4. unknown key-share. Entity A cannot be coerced into sharing a key with entity B without A's knowledge, i.e. when A believes the key is shared with some entity C≠B, and B (correctly) believes the key is shared with A.
5. key control. Neither entity should be able to force the session key to a preselected value.

Desirable performance attributes of AK and AKC protocols include a minimal number of passes (the number of messages exchanged in a run of the protocol), low communication overhead (total number of bits transmitted), and low computation overhead. Other attributes that may be desirable in some circumstances include role-symmetry (the messages transmitted between entities have the same structure), non-interactiveness (the messages transmitted between the two entities are independent of each other), and the non-reliance on encryption, hash functions (since these are notoriously hard to design), and timestamping (since it is difficult to implement securely in practice).

It is therefore an object of the present invention to provide a key agreement protocol in which the above disadvantages are obviated or mitigated and attainment of the desirable attributes is facilitated.

SUMMARY

In one aspect, a key agreement protocol performed between a pair of entities communicating over a data communication system is provided, each of the entities having associated therewith a long term private key, a cryptographic corresponding long term public key generated using the long term private key and a generator point, and an identity, the protocol comprising: generating for each entity a respective session private key and cryptographic corresponding session public key; communicating to the other entity each entity's session public key; obtaining at each entity the identifier of the both entities; generating a common value comprising combining at each entity the session public key of the entity, the session public key of the other entity and the identities of each entity; generating for each entity a respective secret value comprising combining the common value with the entity's session private key and long term private key; computing at each entity an ephemeral value comprising combining the session public key of the other entity, the common value and the long term public key of the other entity; and generating at each entity a shared secret from the entity's secret value and the ephemeral value.

In another aspect, a cryptographic communication system is provided, the system comprising a pair of cryptographic correspondents configured to implement the key agreement protocol of any one of claims 1 to 9.

In a further aspect, a cryptographic correspondent device is provided, the device comprising a processor and a memory, the memory having stored thereon a long term private key, the device further having associated therewith a cryptographic corresponding long term public key generated using the long term private key and a generator point, and an identity, the memory further having stored thereon computer instructions which when executed by the processor cause the processor to implement a key agreement protocol comprising: generating a session private key and cryptographic corresponding session public key; communicating over a data communication system to another cryptographic correspondent device the session public key; obtaining from the other cryptographic correspondent device its session public key; obtaining the identifier of the both correspondents; generating a common value comprising combining the session public key of the correspondent, the session public key of the other correspondent and the identities of each correspondent; generating a secret value comprising combining the common value with the correspondent's session private key and long term private key; computing an ephemeral value comprising combining the session public key of the other correspondent, the common value and the long term public key of the other correspondent; and generating a shared secret from the correspondent's secret value and the ephemeral value.

In general terms, the protocol combines session public keys of each entity and the identities of each entity to obtain a common value that binds the two entities. This is used by each entity to generate a respective secret value by combining the common value and both the session and long term private keys of the entity. The secret value is used as an ephemeral private key. The other entity computes an ephemeral public key corresponding to the secret value of the one entity, using the common value. Each entity may then generate a shared secret from its ephemeral private key and the ephemeral public key of the other entity.

Preferably, the shared secret is used as an input to a key derivation function to obtain a shared key.

Preferably also the protocol is implemented in an elliptic curve cryptosystem and the combination of the public keys is performed by point addition.

As a further preference, the identity of the entities is obtained from a cryptographic certificate issued by a trusted party.

By binding the entities as described above, each run will generate a new secret value, and with proper selection of the parameters having regard to normal cryptographic practices, the desirable attributes will be attained.

DESCRIPTION OF THE DRAWINGS

An embodiment of the present invention will now be described by way of example only with reference to the accompanying drawings, in which.

DETAILED DESCRIPTION

As described below, an efficient two-pass AK protocol is proposed which is based on Diffie-Hellman key agreement and has many of the desirable security and performance attributes discussed in the 1997 paper by S. Blake-Wilson, D. Johnson, and A. Menezes entitled "Key agreement protocols and their security analysis".

The protocol described below has been described in the setting of the group of points on an elliptic curve defined over a finite field. However, it can be easily modified to work in any finite group in which the discrete logarithm problem appears intractable. Suitable choices include the multiplicative group of a finite field, subgroups of $Z^*_n$, where n is a composite integer, and non-trivial subgroups of $Z^*_p$ of prime order q. Elliptic curve groups are advantageous because they offer equivalent security as the other groups but with smaller key sizes and faster computation times.

Figure 1:
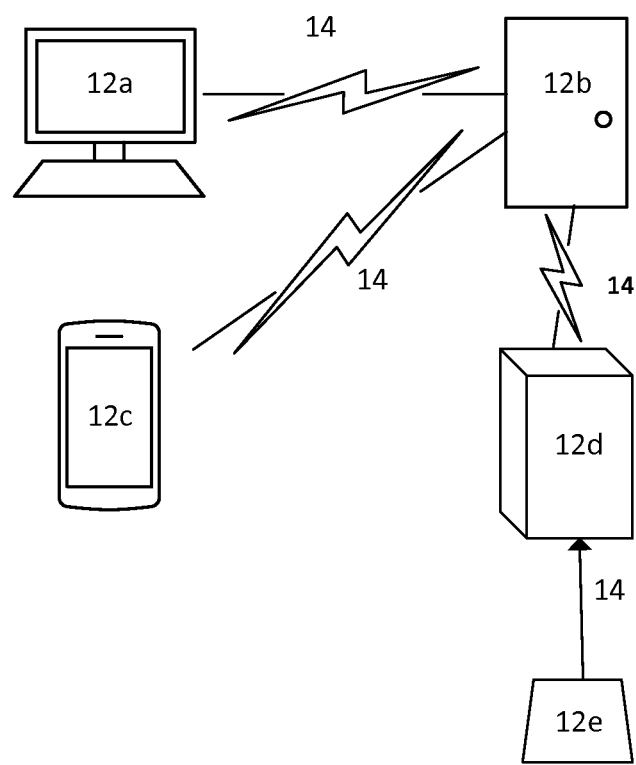
FIG. 1 is a schematic representation of a data communication system.

Referring therefore to FIG. 1, a data communication system 10 includes a plurality of devices 12 interconnected by communication links 14. The devices 12 may be of any known type including a computer 12a, a server 12b, a cellphone 12c, ATM 12d, and smart card 12e. The communication links 14 may be conventional fixed telephone lines, wireless connections implemented between the devices 12, near field communication connections such as Blue tooth or other conventional form of communication.

The devices 12 will differ according to their intended purpose, but typically will include a communication module 20 (FIG. 2) for communication to the links 14. A memory 22 provides a storage medium for non-transient instructions to implement protocols and to store data as required. The instructions are executed by a cryptographic processor (30). A secure memory module 24, which may be part of memory 22 or may be a separate module, is used to store private information, such as the private keys used in the encryption protocols and withstand tampering with that data. An arithmetic logic unit (ALU) 26 is provided to perform the arithmetic operations instruction by the memory 22 using data stored in the memories 22, 24. A random or pseudo random number generator 28 is also incorporated to generate bit strings representing random numbers in a cryptographically secure manner.

Figure 2:
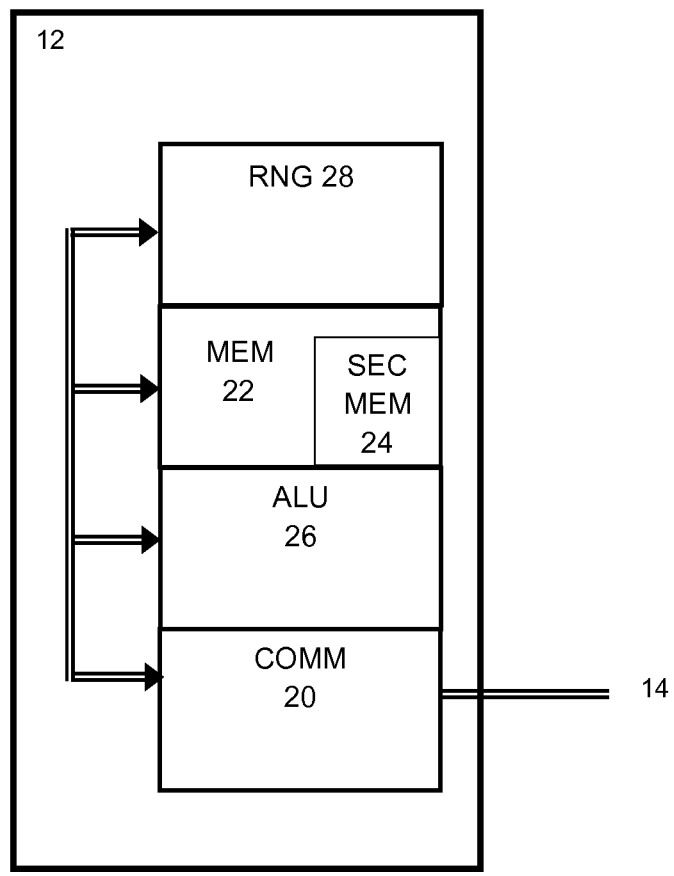
FIG. 2 is a representation of a device used in the data communication system of FIG. 1.

It will be appreciated that the device 12 illustrated in FIG. 2, is highly schematic and representative of a conventional device used in a data communication system.

The memory 22 stores system parameters for the cryptosystem to be implemented and a set of computer readable instructions to implement the required protocol. In the case of an elliptic curve cryptosystem, elliptic curve domain parameters consist of six quantities q, a, b, P, n, and h, which are:

The field size q

The elliptic curve coefficients a and b

The base point generator P

The order n of the base point generator

The cofactor h, which is the number such that hn is the number of points on the elliptic curve.

The parameters will be represented as bit strings, and the representation of the base point G as a pair of bit strings, each representing an element of the underlying field. As is conventional, one of those strings may be truncated as the full representation may be recovered from the other co-ordinate and the truncated representation.

The secure memory module 24 contains a bit string representing a long term private key d, and the corresponding public key Q. For an elliptic curve cryptosystem, the key Q=dP.

Secure memory 24 will also include an identification ID of the device 12. Conveniently this will be a certificate issued by a trusted authority to permit third party verification of the identity. A convenient form of certificate is an ECQV certificate, as set out in the SEC 4 standard.

Ephemeral values computed by the ALU may also be stored within the secure module 24 if their value is intended to be secret.

Figure 3:
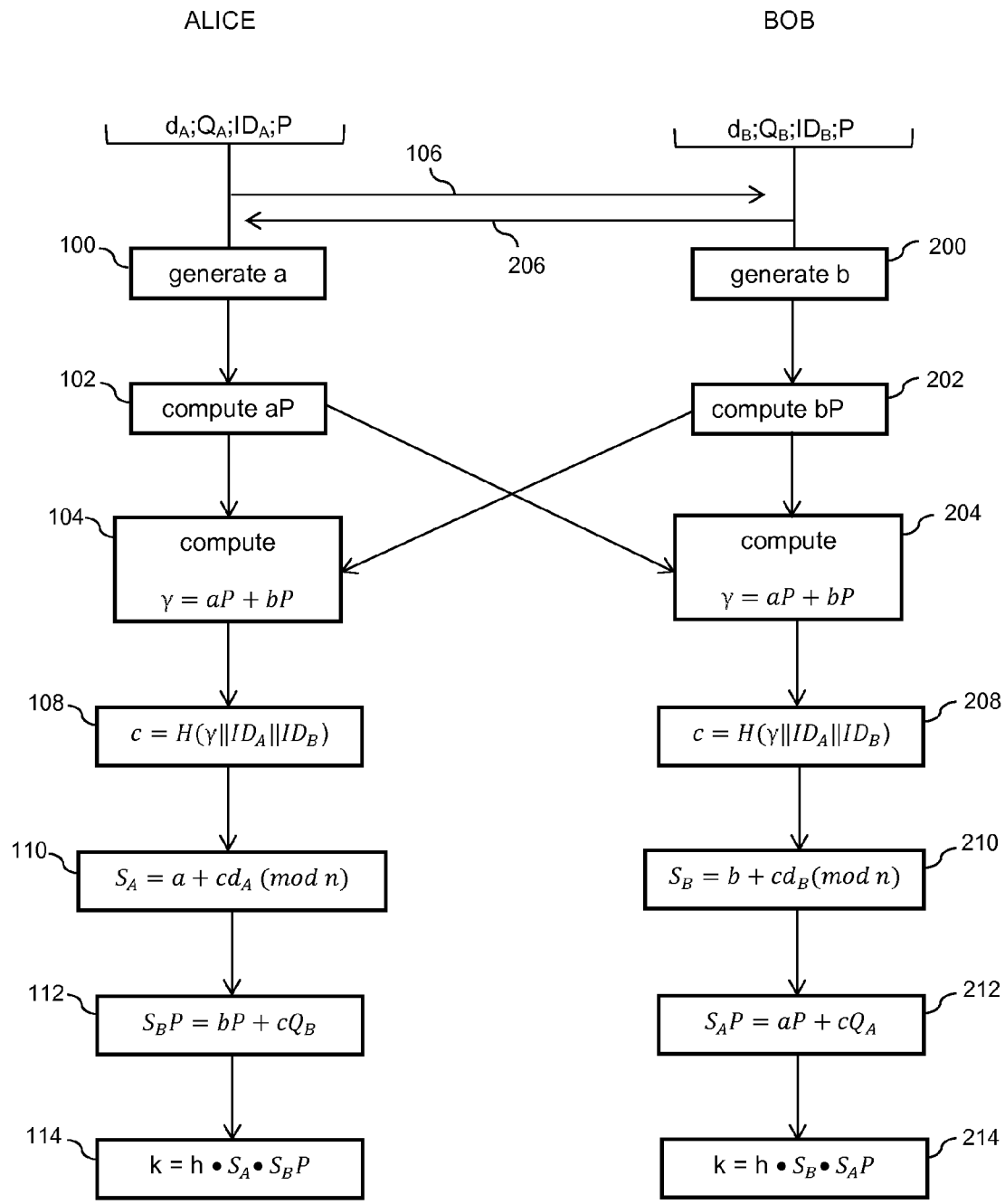
FIG. 3 is a flow chart showing the protocol implemented between a pair of devices shown in FIG. 1.

The key agreement protocol is shown in FIG. 3, performed between a pair of devices referred to as the entity Alice and the entity Bob. Values associated with Alice will be denoted by the suffix A and those of Bob by the suffix B. Alice has a long term private key $d_A$ and corresponding public key $Q_A$ stored in the secure memory module 24.

Similarly Bob has a private key $d_B$ and corresponding public key $Q_B$ stored in his secure memory module 24.

Entities Alice and Bob want to share a common key, and therefore implement through the instructions stored in the memory 22, the protocol shown in FIG. 3.

At 100, Alice generates a random integer using the RNG 28 and stores the integer value a as session private key in the secure module 24. Alice's ALU 26 computes, at 102, a corresponding session public key aP which she sends over a communication link 16 to Bob. The session public key aP is a representation of a point on the curve and has a pair of bit strings, each representing an element in the underlying field. In some implementations of the computations performed by the ALU 26, it is only necessary to use the x co-ordinate of the point, in which case the y co-ordinate is not required. The x co-ordinate is in that situation representative of the public key aP. The y co-ordinate may be recovered from the x co-ordinate if required. Point compression techniques, in which an indication of the value of the y co-ordinate is sent with the x co-ordinate, may also be used if preferred to reduce the bandwidth in transmission.

Similarly, at 200, Bob generates a random integer with his RNG 28 which he stores in his secure module 24 as session private key b. A corresponding session public key bP is computed at 202 and sent to Alice over a communication link 16.

Both Alice and Bob perform a point addition using the ALU 26 to compute $\gamma$=bP+aP, as shown at 104, 204. This will in turn be a further point, $\gamma$, on the curve, and thus represented as a pair of elements. In embodiments, it is possible to use only the x-coordinate of the sum of the public keys in the computation of $\gamma$.

In further embodiments, wherein the protocol is implemented in a hyperelliptic curve cryptosystem, the combination of the public keys is performed by point addition in the Jacobian of the hyperelliptic curve.

Both Alice and Bob obtain copies of the others identity ID (106, 206). This may be done prior to the implementation of the protocol or the certificate may be sent with the session public keys. The certificate may be verified by the recipient if required.

At 108, 208, Alice and Bob each compute a common value c=H($\gamma$//ID$_A$//ID$_B$) compute where H is a cryptographically secure hash function, such as a SHA2 hash function. The value c is stored in the memory 22. The common value c binds Alice and Bob. By concatenating the identities ID, it is necessary to determine the order in which the string representing c is assembled. As an alternative therefore the identities may be combined by XORing the ID's and thereby permit the string to be assembled without concern for their order. Similarly $\gamma$ may be XOR'd with the ID's if preferred.

Alice computes at 110 a component $s_A$=a+cd$_A$ (mod n) which uses the long term and short term private keys stored in the secure module 24.

Similarly, Bob, at 210, computes $s_B$=b+cd$_B$ (mod n)

From public information, including the session public key bP received from Bob, Alice can compute $s_B$P=bP+cQ$_B$, as shown at 112.

Similarly, Bob can compute $s_A$P=aP+cQ$_A$ (212).

Alice and Bob each have a component computed from private information and the common value and a component computed from public information. These can be combined to provide a shared secret.

Therefore, at 114, 214, Alice and Bob can both compute, as the shared secret, the value K=h $s_A s_B$P.

Alice has computed $s_B$P from public information and has stored the value $s_A$.

Similarly, Bob has computed $s_A$P and has stored the value $s_B$.

Another option to compute the shared secret is for Alice to compute K=$s_A \cdot s_B$ P and Bob to compute K=$s_B \cdot s_A$P, ignoring the cofactor h. This is useful when the value of h is small, e.g. 1, or there is resistance against the small group attack.

The protocol described above therefore establishes a shared secret K between two entities. A key derivation function should then be used to derive a secret key from the shared secret. This is necessary because the shared secret K may have some weak bit—bits of information about K that can be predicted correctly with non-negligible advantage.

One way to derive a key from the shared secret K is to apply a one-way hash function such as SHA-1 to K. Alternatively, other key derivation functions may be used as detailed more fully at Chapter XX of the Handbook of Applied Cryptography, the contents of which are incorporated by reference.

In summary, the key agreement protocol may be implemented using the following algorithm:—
1. Alice obtains an authentic copy of Bob's long term public key $Q_B$
2. Alice generates a random integer to provide a session private key a (0<a<n).
3. Alice computes aP and sends this to Bob.
4. Bob obtains an authentic copy of Alice's public key $Q_A$.
5. Bob generates a random integer b, (0<b<n).
6. Bob computes bP and sends this to Alice.
7. Alice computes $s_A$=a+cd$_A$ (mod n), where c=H($\gamma$//ID$_A$//ID$_B$). (Note: The ID$_A$ and ID$_B$ may contain the public keys of Alice and Bob respectively).
8. Alice computes $s_B$P=bP+cQ$_B$. (Note: Bob sent Alice bP and she obtained an authentic copy of Q$_B$).
9. Bob computes $s_B$=b+cd$_B$ (mod n)
10. Bob computes from public information $s_A$P=aP+cQ$_A$.
11. Both Alice and Bob can now compute as the shared secret K=h·$s_A$·$s_B$P, where h is the cofactor.
12. The shared secret may be used as the input to a key derivation function, if required.

Another option to compute the shared secret is for Alice to compute K=$s_A \cdot s_B$P and Bob to compute K=$s_B \cdot s_A$P, ignoring the cofactor h. This is useful when the value of h is small, e.g. 1, or there is resistance against the small subgroup attack.

We claim:

1. A key agreement protocol method performed between a pair of entities communicating over a data communication system, each of the entities comprising a memory, each of the entities having associated therewith a long term private key stored in the memory, a cryptographic corresponding long term public key generated using the long term private key and a generator point, and an identity, the key agreement protocol method comprising:
   generating for each entity a respective session private key and a cryptographic corresponding session public key;
   a first of the pair of entities communicating to a second of the pair of entities the first of the pair of entity's session public key;
   the second of the pair of entities communicating to the first of the pair of entities, the second of the pair of entity's session public key;
   obtaining at each entity the identities of the first of the pair of entities and the second of the pair of entities;
   generating a common value comprising combining at each entity the session public key of the entity, the session public key of the other entity and the identities of each entity;

generating for each entity a respective secret value comprising combining the common value with the entity's session private key and long term private key;

computing at each entity an ephemeral value comprising combining the session public key of the other entity, the common value and the long term public key of the other entity; and generating at each entity a shared secret from the entity's secret value and the ephemeral value and storing said shared secret in the memory.

2. The protocol of claim 1 wherein the shared secret is used as an input to a key derivation function to obtain a shared key.

3. The protocol of claim 1 wherein generating the common value comprises applying an XOR operation to the identities of each entity.

4. The protocol of claim 1 wherein the protocol is implemented in an elliptic curve cryptosystem and the combination of the session public keys is performed by point addition.

5. The protocol of claim 1 wherein the protocol is implemented in an elliptic curve cryptosystem and the generation of the common value comprises obtaining an x-coordinate of the sum of the public keys.

6. The protocol of claim 1 wherein the protocol is implemented in a hyperelliptic curve cryptosystem and the combination of the public keys is performed by point addition in the Jacobian of the hyperelliptic curve.

7. The protocol of claim 1 wherein the generating of the session public key comprises scalar multiplication of the session private key and the generator point.

8. The protocol of claim 1 wherein the combination of the secret value and the ephemeral value is the scalar multiplication of the secret value and the ephemeral value.

9. The protocol of claim 1 wherein the combination of the secret value and the ephemeral value is the scalar multiplication of the cofactor, the secret value and the ephemeral value.

10. The protocol of claim 1 wherein the identity of the entities is obtained from a cryptographic certificate issued by a trusted party.

11. A cryptographic communication system comprising a pair of cryptographic correspondents configured to implement the key agreement protocol of claim 1.

12. A cryptographic correspondent device comprising a processor and a memory, the memory having stored thereon a long term private key, the device further having associated therewith a cryptographic corresponding long term public key generated using the long term private key and a generator point, and an identity, the memory further having stored thereon computer instructions which when executed by the processor cause the processor to implement a key agreement protocol method comprising:

generating a session private key and a cryptographic corresponding session public key;

communicating over a data communication system to an other cryptographic correspondent device the session public key;

obtaining from the other cryptographic correspondent device its session public key;

obtaining the identities of the cryptographic correspondents device and the other cryptographic correspondent device;

generating a common value comprising combining the session public key of the cryptographic correspondent device, the session public key of the other cryptographic correspondent device and the identities of the cryptographic correspondent device and the other cryptographic correspondent device;

generating a secret value comprising combining the common value with the session private key and long term private key of the cryptographic correspondent device;

computing an ephemeral value comprising combining the session public key of the other cryptographic correspondent device, the common value and the long term public key of the other cryptographic correspondent device; and generating a shared secret from the secret value of the cryptographic correspondent device and the ephemeral value.

13. The protocol of claim 12 wherein the shared secret is used as an input to a key derivation function to obtain a shared key.

14. The protocol of claim 12 wherein generating the common value comprises applying an XOR operation to the identities of each cryptographic correspondent device.

15. The protocol of claim 12 wherein the protocol is implemented in an elliptic curve cryptosystem and the combination of the session public keys is performed by point addition.

16. The protocol of claim 12 wherein the protocol is implemented in an elliptic curve cryptosystem and the generation of the common value comprises obtaining an x-coordinate of the sum of the public keys.

17. The protocol of claim 12 wherein the protocol is implemented in a hyperelliptic curve cryptosystem and the combination of the public keys is performed by point addition in the Jacobian of the hyperelliptic curve.

18. The protocol of claim 12 wherein the generating of the session public key comprises scalar multiplication of the session private key and the generator point.

19. The protocol of claim 12 wherein the combination of the secret value and the ephemeral value is the scalar multiplication of the secret value and the ephemeral value.

20. The protocol of claim 12 wherein the combination of the secret value and the ephemeral value is the scalar multiplication of the cofactor, the secret value and the ephemeral value.

21. The protocol of claim 12 wherein the identity of the correspondents is obtained from a cryptographic certificate issued by a trusted party.

* * * * *